United States Patent
Morotti et al.

(10) Patent No.: US 7,255,905 B2
(45) Date of Patent: Aug. 14, 2007

(54) TILE WHICH CAN BE MODELLED IN A COLD STATE AND A PROCESS FOR MANUFACTURING THE TILE

(76) Inventors: Giuliano Morotti, No. 2, Via Fornace, Baiso (Reggio Emilia) (IT) I-42031; Daniele Bassi, No. 171, Via S. Donnino, Carpineti (Reggio Emilia) (IT) I-42033

(*) Notice: Subject to any disclaimer, the term of this patent is extended or adjusted under 35 U.S.C. 154(b) by 0 days.

(21) Appl. No.: 10/695,787

(22) Filed: Oct. 30, 2003

(65) Prior Publication Data
US 2004/0241373 A1    Dec. 2, 2004

(30) Foreign Application Priority Data
Feb. 21, 2003 (IT) .............................. MO03A0039

(51) Int. Cl.
*B32B 3/14* (2006.01)
*E04F 13/08* (2006.01)
(52) U.S. Cl. ........................... 428/47; 428/78; 52/384; 52/388; 52/390
(58) Field of Classification Search ................. 428/49, 428/77, 137, 172, 78; 52/390, 392, 594, 52/595, 384, 385, 288, 389
See application file for complete search history.

(56) References Cited

U.S. PATENT DOCUMENTS

| | | | | |
|---|---|---|---|---|
| 2,253,219 A | * | 8/1941 | Alexander | ................. 144/349 |
| 2,508,128 A | | 5/1950 | Waards | |
| 2,680,319 A | * | 6/1954 | Dratler | ......................... 156/63 |
| 2,887,867 A | * | 5/1959 | Burchenal et al. | ............ 428/44 |
| 3,077,059 A | * | 2/1963 | Stout | ............................ 52/388 |
| 3,411,257 A | * | 11/1968 | Yaremchuk | .................. 52/415 |
| 4,804,569 A | * | 2/1989 | Arisawa | ....................... 428/47 |
| 5,232,762 A | * | 8/1993 | Ruby | ......................... 428/167 |
| 5,380,392 A | | 1/1995 | Imamura et al. | |
| 5,618,601 A | * | 4/1997 | Ruby | .......................... 428/56 |
| 5,824,382 A | * | 10/1998 | Ruby | .......................... 428/56 |

FOREIGN PATENT DOCUMENTS

| | | |
|---|---|---|
| FR | 2 636 936 | 3/1990 |
| GB | 440681 | 1/1936 |

* cited by examiner

*Primary Examiner*—Donald J. Loney
(74) *Attorney, Agent, or Firm*—Young & Thompson

(57) ABSTRACT

The modellable tile has an upper surface and a bottom surface and comprises a thin and flexible support element associated to the bottom surface, and at least one recess which involves a whole width of the tile but not the thin and flexible support element. The recess separates the tile into at least two parts which are totally separated one from another, which parts exhibit upper edges which are located side-by-side and which are destined to be brought into reciprocal contact in order to give the tile a predetermined non-flat conformation.

20 Claims, 1 Drawing Sheet

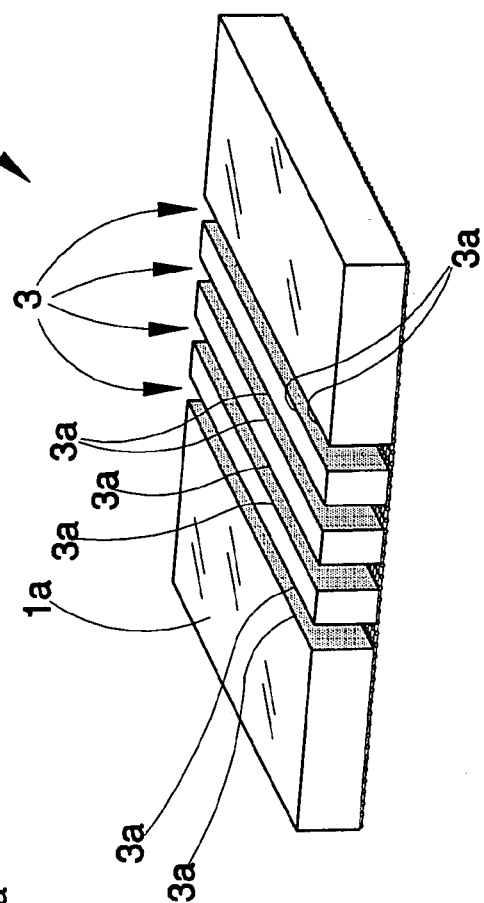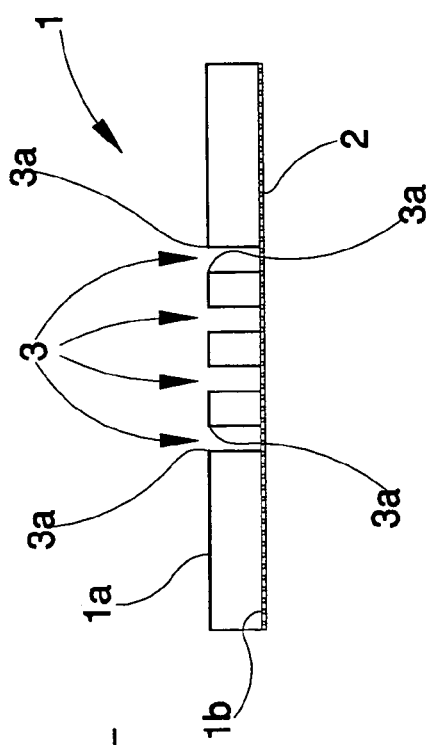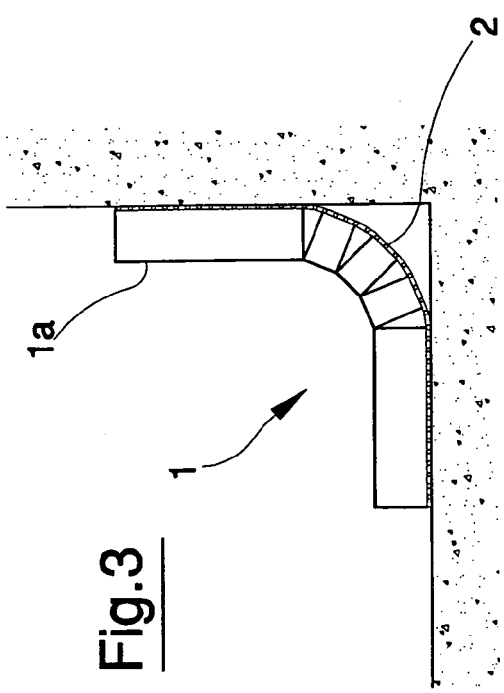

TILE WHICH CAN BE MODELLED IN A COLD STATE AND A PROCESS FOR MANUFACTURING THE TILE

BACKGROUND OF THE INVENTION

The invention relates to a tile which can be shaped when cold in order to take on a non-flat configuration, and also to a process which produces the tile.

The invention is usefully applied in tiles or slabs of all types of materials. In particular the invention is applicable to ceramic tiles, for slabs or tiles made of marble, natural stone and stone materials in general.

In the realization of tiled floors using tiles or slabs, skirting is frequently laid using the same tiles or slabs which have been used for the floor itself. It is therefore common to use (for the skirting) portions of the tiles or slabs cut to a desired size. The portions are then laid or glued to the wall one next to another along the perimeter of the floor or floor covering, with a perpendicular lie plane to the tiles or slabs forming the floor or floor covering.

This process is rather long and laborious due to the tile-cutting operations and the laying thereof, neither of which is immune to imprecision. Cutting same-size pieces of tile is problematic, and since the resulting pieces tend to be small, laying operations are often fraught with difficulty.

The prior art includes other processes for realizing corner finishing involving floor/covering couplings with ceramic tiles, one of which processes consists in realizing special products formed by pressing or drawing and subsequently firing them.

The main aim of the present invention is to obviate the drawbacks in the prior art by providing a tile which can be modelled while in the cold state, in order to take on a non-flat configuration which is constructionally simple and easy to apply.

The invention also provides a process for modelling tiles into predetermined non-flat shapes which is particularly simple and economical.

SUMMARY OF THE INVENTION

The modellable tile has an upper surface and a bottom surface and comprises a thin and flexible support element associated to the bottom surface, and at least one recess which involves a whole width of the tile but not the thin and flexible support element. The recess separates the tile into at least two parts which are totally separated one from another, which parts exhibit upper edges which are located side-by-side and which are destined to be brought into reciprocal contact in order to give the tile a predetermined non-flat conformation.

BRIEF DESCRIPTION OF THE DRAWINGS

Further characteristics and advantages will better emerge from the detailed description that follows, of a tile which can be modelled while in the cold state and a process for modelling tiles into predetermined non-flat conformations, here represented by way of non-limiting example in the figures of the drawings, in which:

FIG. 1 is a plan view of a tile according to the invention;

FIG. 2 is a transversal section of the tile of FIG. 1 according to line A-A;

FIG. 3 is a view of the tile of FIG. 2 once laid.

DESCRIPTION OF THE PREFERRED EMBODIMENTS

With reference to the figures of the drawings, 1 denotes in its entirety a tile (or slab) according to the invention. The tile exhibits an upper surface 1a, which is the surface in view, and a bottom surface 1b, which the tile is laid on, and further comprises a thin and flexible support element 2 which is associated to the bottom surface 1b, for example by gluing.

At least one recess 3 is cut into the tile 1, throughout the thickness of the body of the tile 1 but not involving the support element 2. In the illustrated embodiment each recess 3 separates the body of the tile into two totally-disconnected parts, and is delimited at the upper surface of the tile 1 by upper edges 3a, which are predisposed to be brought into reciprocal contact in order to bring the tile 1 into a non-flat predetermined configuration.

The support element 2 comprises a support structure which is glued to the laying surface i.e. the bottom surface 1b of the tile 1.

Thanks to the presence of the recesses 3 and the support element 2, which keeps the separated parts of the tile 1 together, the separated parts can then be brought to meet each other by bending the portion of support element 2 which keeps the two or more parts of tile separate when in a flat configuration, so that the upper edges 3a of the parts of tile come into reciprocal contact and give the tile a predetermined non-flat conformation.

Obviously the tile 1 can be "bent" along each single recess 3 to a determined angle which depends on the shape and size of the transversal section of the recess to assume and maintain a predetermined non-flat conformation.

Recesses can be made with straight transversal sections of various shapes and sizes. Thus, apart from the usual recesses 3 with constant straight transversal section (in the shape of a straight rectangular parallelogram) recesses with walls inclined by 45° with respect to the upper surface of the tile 1 can be made. This makes possible, for example, "bending" the tile to any angle, especially a right angle.

Making the recesses is easily achieved, in known ways and using cutting machines already widely used in the prior art, especially for cutting ceramic tiles.

By cutting a plurality of parallel recesses 3 of predetermined widths and at predetermined distances one from another, as in the embodiment of FIG. 3, a tile 1 can be produced with a non-flat conformation characterised by a "bend" therein, or rather a continuous profile composed originally of a broken line. By reducing the distance between the transversal recesses 3, i.e. the lengths of the sides of the broken profile, and increasing the number of recesses, the continuous profile of above can be approximated ever more closely to a curve.

Tiles 1 having an upper surface 1a and a bottom surface 1b are modelled in the cold state in a process which is characterised in that it comprises the following stages:

fixing a thin and flexible support element 2 to the bottom surface 1b of a tile;

realizing at least one recess 3 which passes entirely through the width of the tile 1 body, but does not pass through the thin and flexible support element 2;

the at least one recess 3 separating the tile 1 body into at least two parts, which two parts are entirely separated one from another and which are delimited by reciprocally-facing upper edges 3a destined to be brought into reciprocal contact in order to assume the non-flat predetermined conformation;

a reciprocal nearing, by a bending of a portion of the thin and flexible support 2 keeping the two parts of the tile separated by the recess 3, of the two parts so that the upper edges 3a of the two parts are brought into reciprocal contact in order to create the non-flat conformation of the tile 1.

Most frequently the process includes, after a first fixture stage (for example by gluing) of the thin and flexible element 2 to the bottom surface 1b of a tile, the following stages:

realization of a plurality of parallel recesses 3 of predetermined width and located at predetermined distances one from another; the plurality of recesses involving a whole width of the tile 1 body but not the thin and flexible support 2, and dividing the tile 1 body into a number of reciprocally-separate parts; each recess 3 being delimited by upper edges 3a of tile sections, reciprocally facing one another, which upper edges 3a are destined to be brought into reciprocal contact in order to bring the tile 1 into the predetermined non-flat conformation;

a nearing of the two parts of the tile 1 divided by the recess 3 by means of bending a portion of the thin and flexible support 2 which keeps the two parts of tile 1 united, so that the upper edges 3a of the two parts of tile 1 are brought into reciprocal contact in order to bring the tile 1 into the predetermined non-flat conformation.

In a further embodiment of the invention, the first two stages as described above can be inverted, giving the following order:

realization of at least one recess 3 involving a whole width of the tile 1 body;

the at least one recess 3 separating the tile 1 body into at least two parts, which two parts are entirely separated one from another and which are delimited by reciprocally-facing upper edges 3a destined to be brought into reciprocal contact in order to assume the non-flat predetermined conformation;

fixing of a thin and flexible support element 2 to the bottom surface 1b of a tile 1;

a nearing of the two parts of tile 1 by bending a portion of the thin and flexible support element 2 supporting the two parts of tile 1, so that reciprocally-facing upper edges 3a of the two parts of tile are brought into contact with one another in order to give the tile 1 the predetermined non-flat conformation. The invention provides important advantages.

The recesses 3 are made using usual tile cutting machines, and can be cut on a standard continuous production line.

The whole operation, gluing and cutting, can be carried out in-line as can the packaging of the finished product (the cut tile), which needs no special packaging with respect to an uncut tile.

The tile obtained provides a homogeneous skirting effect, differently to tiles normally used for flooring and/or covering.

The original perimeter dimensions of the tile (in its normal flat configuration) are not changed.

Laying the "bent" tiles is quite easy and enables precise and regular realization of other angled finishings.

What is claimed is:

1. A tile, comprising:
a flexible support having a length and a width, the flexible support consisting essentially of a first surface section joined by a second surface section to a third surface section, the flexible support bendable from a planar configuration to an overall orthogonal configuration where that the first surface section is orthogonal to the third section and the bent second surface section forms a quarter-circle arcuate surface;
a first rectangular surface element adhered to and covering the entire first surface section;
plural second rectangular surface elements adhered to and running the length of the second surface section;
a third rectangular surface element adhered to and covering the entire third surface section; and
parallel air volume recesses running the length of the support located between the first surface element and a first of the second surface elements, between each of the second surface elements, and between a last of the second surface elements and the third surface element, wherein,
the flexible support, with the first, second and third surface elements adhered thereto, is bendable from the planar configuration to the overall orthogonal configuration where that the first surface section is orthogonal to the third section and the bent second surface section forms the quarter-circle arcuate surface,
with the flexible support in the orthogonal configuration, exposed surfaces of the first, second and third section adjoin each other to form a continuous exterior surface,
in the planar configuration, the recesses are each straight rectangular parallelograms,
in the orthogonal configuration, the recesses are each straight sections with a triangular transversal section, and
an entirety of lower surfaces of the first, second and third surface elements bond to the flexible support,
wherein the first, second and third surface elements are selected from the group consisting of ceramic, marble, and natural stone, and
when in the overall orthogonal configuration and viewed from an end that presents the first surface section orthogonal to the third section and the bent second surface section forming the quarter-circle arcuate surface, the first, second and third surface elements have both a rectangular surface area and a rectangular cross section perpendicular to the rectangular surface area.

2. A tile, comprising:
a flexible support having a length and a width, the flexible support being bent along the width to define, as viewed from an end in transversal section, a horizontal first surface section joined by a bent second surface section to a vertical third surface section so that the first surface section is orthogonal to the third section and the bent second surface section forms a quarter-circle arcuate surface;
a first rectangular surface element adhered to and covering the entire first surface section;
plural second rectangular surface elements adhered to and running the length of the bent second surface section;
a third rectangular surface element adhered to and covering the entire third surface section; and
air volumes running the length of the support located between the first surface element and a first of the second surface elements, between each of the second surface elements, and between a last of the second surface elements and the third surface element, wherein,
exposed surfaces of the first, second and third section adjoining each other to form a continuous exterior surface,
wherein the first, second and third surface elements are selected from the group consisting of ceramic, marble, and natural stone and have both a rectangular surface area and a rectangular cross section perpendicular to the rectangular surface area.

3. The tile of claim 2, wherein the tile forms a floor-wall skirting.

4. The tile of claim 2, wherein an entirety of lower surfaces of the first, second and third surface elements bond to the flexible support.

5. The tile of claim 4, wherein the first, second and third surface elements bond to the flexible support via glue.

6. A tile, comprising:
a flexible support having a length and a width, the flexible support comprising a first surface section joined by a second surface section to a third surface section, the flexible support bendable from a planar configuration to an overall orthogonal configuration where that the first surface section is orthogonal to the third section and the bent second surface section forms a quarter-circle arcuate surface;
a first rectangular surface element adhered to and covering the entire first surface section;
plural second rectangular surface elements adhered to and running the length of the second surface section;
a third rectangular surface element adhered to and covering the entire third surface section; and
parallel air volume recesses running the length of the support located between the first surface element and a first of the second surface elements, between each of the second surface elements, and between a last of the second surface elements and the third surface element, wherein,
with the flexible support in the orthogonal configuration, exposed surfaces of the first, second and third section adjoin each other to form a continuous exterior surface, wherein,
the first, second and third surface elements are selected from the group consisting of ceramic, marble, and natural stone,
an entirety of lower surfaces of the first, second and third surface elements bond to the flexible support
in the planar configuration, the recesses are each straight rectangular parallelograms,
in the orthogonal configuration, the recesses are each straight sections with a triangular transversal section, and
each of the first, second, and third surface elements are straight rectangular parallelograms,
each of the second surface elements are of the same shape and size, and
the first and third surface elements are of a size different from the second surface elements.

7. The tile of claim 6, wherein the tile forms a floor-wall skirting.

8. The tile of claim 6, wherein the first, second and third surface elements bond to the flexible support via glue.

9. The tile of claim 1, wherein the first, second and third surface elements are natural stone.

10. The tile of claim 1, wherein the first, second and third surface elements are marble.

11. The tile of claim 2, wherein the first, second and third surface elements are natural stone.

12. The tile of claim 2, wherein the first, second and third surface elements are marble.

13. The tile of claim 6, wherein, the first, second and third surface elements are natural stone.

14. The tile of claim 6, wherein, the first, second and third surface elements are marble.

15. The tile of claim 6, wherein the first, second and third surface elements are ceramic tile elements.

16. The tile of claim 13, wherein, each of the first, second, and third surface elements have both a rectangular surface area and a rectangular cross section perpendicular to the rectangular surface area.

17. The tile of claim 14, wherein, each of the first, second, and third surface elements have both a rectangular surface area and a rectangular cross section perpendicular to the rectangular surface area.

18. The tile of claim 15, wherein, each of the first, second, and third surface elements have both a rectangular surface area and a rectangular cross section perpendicular to the rectangular surface area.

19. The tile of claim 1, wherein, the first, second and third surface elements are ceramic tile elements.

20. The tile of claim 2, wherein, the first, second and third surface elements are ceramic tile elements.

* * * * *